US012623100B2

(12) United States Patent
Adermann et al.

(10) Patent No.: US 12,623,100 B2
(45) Date of Patent: May 12, 2026

(54) FALL ARREST SYSTEM

(71) Applicant: Hog Slat, Inc., Newton Grove, NC (US)

(72) Inventors: James M. Adermann, Clinton, NC (US); Spencer Westerbeek, Clinton, NC (US)

(73) Assignee: Hog Slat, Inc., Newton Grove, NC (US)

( * ) Notice: Subject to any disclaimer, the term of this patent is extended or adjusted under 35 U.S.C. 154(b) by 0 days.

(21) Appl. No.: 18/660,311

(22) Filed: May 10, 2024

(65) Prior Publication Data

US 2024/0374941 A1 Nov. 14, 2024

Related U.S. Application Data

(60) Provisional application No. 63/465,319, filed on May 10, 2023.

(51) Int. Cl.
*A62B 35/00* (2006.01)
*E06C 7/18* (2006.01)

(52) U.S. Cl.
CPC ........ *A62B 35/005* (2013.01); *A62B 35/0068* (2013.01); *A62B 35/0087* (2013.01); *E06C 7/186* (2013.01)

(58) Field of Classification Search
CPC .............. A62B 35/005; A62B 35/0037; A62B 35/0068; A62B 35/0087; E06C 7/186;
(Continued)

(56) References Cited

U.S. PATENT DOCUMENTS 2,886,277 A * 5/1959 Boham ..................... E06C 7/48 248/205.5
3,523,591 A * 8/1970 Fountain ................. E06C 7/187 182/8
(Continued)

FOREIGN PATENT DOCUMENTS

AU 2008100063 A4 * 2/2008
AU 2018214006 A1 * 2/2020 ........... A62B 35/005
(Continued)

OTHER PUBLICATIONS

Grainger, "LAD-SAF™ Flexible Cable Safety Systems," Installation Instructions, 5908282 Rev. K, Oct. 2019, available online: [URL: https://www.grainger.com/ec/pdf/487R49_2.pdf], 236 pages.
(Continued)

*Primary Examiner* — Taylor Morris
(74) *Attorney, Agent, or Firm* — WITHROW & TERRANOVA, PLLC

(57) ABSTRACT

A fall arrest system is disclosed. In one aspect, a structure may include a collar on the roof portion of the structure. A U or V-shaped anchor point has leaves or legs of the U or V-shape attached to spaced-apart locations on the collar. A cable may be attached to the anchor point and extended off the roof and down a side of the structure proximate to a ladder. A distal end of the cable may be tensioned by a cable tensioner. A rope grab may be attached to the cable. A pulley or similar structure may be used at the edge of the roof and side to protect the cable from rubbing against the edge. In use, a person attaches to the rope grab and climbs the ladder to the top of the structure.

11 Claims, 5 Drawing Sheets

(58) Field of Classification Search

CPC . E06C 7/165; E06C 7/188; E06C 7/48; E06C 7/12; E06C 7/187; E06C 7/00; E04G 21/3276; E04G 21/3295

USPC .......................................................... 248/205.1

See application file for complete search history.

(56) References Cited

U.S. PATENT DOCUMENTS

| | | | | | |
|---|---|---|---|---|---|
| 3,908,791 | A * | 9/1975 | Kleine | E06C 7/186 | 182/8 |
| 4,193,475 | A * | 3/1980 | Sweet | E06C 7/187 | 182/8 |
| 4,379,498 | A * | 4/1983 | Krusmark | E06C 7/48 | 182/206 |
| 5,248,021 | A * | 9/1993 | Nichols | E04D 13/12 | 248/237 |
| 5,361,558 | A * | 11/1994 | Thornton | E04D 13/12 | 52/27 |
| 5,875,867 | A * | 3/1999 | Beard | E06C 1/34 | 182/45 |
| 5,896,719 | A * | 4/1999 | Thornton | E04G 5/041 | 52/27 |
| 5,964,316 | A * | 10/1999 | Roy | A62B 35/0068 | 182/8 |
| 6,227,329 | B1 * | 5/2001 | Ador | A62B 35/0068 | 182/36 |
| 6,321,872 | B1 * | 11/2001 | Parker | E04G 5/001 | 182/142 |
| 6,357,707 | B1 * | 3/2002 | Lindsay | B60Q 1/305 | 362/523 |
| 7,219,766 | B2 * | 5/2007 | Deuer | E06C 7/186 | 182/206 |
| 7,665,248 | B2 * | 2/2010 | Blackford | E04G 5/041 | 52/27 |
| 7,854,421 | B2 * | 12/2010 | Florent | F16L 3/243 | 248/300 |
| 8,096,384 | B2 * | 1/2012 | Caylor | A62B 35/0068 | 248/499 |
| 8,875,839 | B1 * | 11/2014 | Licea | E06C 7/186 | 182/8 |
| 9,327,147 | B2 * | 5/2016 | Snider | E04G 5/041 | |
| 9,347,264 | B2 * | 5/2016 | Mosier | E06C 7/188 | |
| 9,364,695 | B2 * | 6/2016 | Chantelois | A62B 35/0081 | |
| 10,486,002 | B1 * | 11/2019 | Drinkwater | E06C 7/18 | |
| 10,718,125 | B2 * | 7/2020 | Lopez | A62B 35/0068 | |
| 10,940,338 | B1 * | 3/2021 | Miller | A62B 35/0068 | |
| 11,480,013 | B2 * | 10/2022 | Adams | E06C 7/186 | |
| 11,655,677 | B2 * | 5/2023 | Perrin | E04G 21/3295 | 52/192 |
| 11,697,038 | B2 * | 7/2023 | Satterfield | A62B 35/0068 | 182/3 |
| 2002/0017427 | A1 * | 2/2002 | Guenette | A62B 1/08 | 182/45 |
| 2002/0079164 | A1 * | 6/2002 | Choate | E04G 21/3295 | 182/36 |
| 2003/0159882 | A1 * | 8/2003 | Franckewich, Jr. | E04G 21/3276 | 182/3 |
| 2009/0188174 | A1 * | 7/2009 | Schreiber | E04G 21/3261 | 24/457 |
| 2011/0315476 | A1 * | 12/2011 | Clarkson | E06C 7/48 | 182/107 |
| 2012/0247869 | A1 * | 10/2012 | Anderson | E06C 7/187 | 182/8 |
| 2013/0327907 | A1 * | 12/2013 | Reitz | F16M 13/025 | 248/210 |
| 2014/0166397 | A1 * | 6/2014 | Reynolds | E06C 7/188 | 29/428 |
| 2017/0022760 | A1 * | 1/2017 | Egress | E06C 7/186 | |
| 2017/0152710 | A1 * | 6/2017 | Miller | E06C 7/482 | |
| 2024/0270539 | A1 * | 8/2024 | Kubik | A62B 35/0068 | |
| 2024/0342522 | A1 * | 10/2024 | Fabbi | A62B 35/0068 | |

FOREIGN PATENT DOCUMENTS

| | | | | | |
|---|---|---|---|---|---|
| AU | 2019257490 | A1 | * | 5/2020 | E06C 7/186 |
| CA | 2119054 | C | * | 6/2000 | A62B 35/005 |
| CA | 2189095 | C | * | 10/2004 | A62B 35/005 |
| DE | 202010011421 | U1 | * | 1/2012 | A62B 35/0068 |
| EP | 0486411 | A1 | * | 5/1992 | A62B 35/0056 |
| EP | 2292874 | A1 | * | 3/2011 | A62B 35/04 |
| EP | 2520740 | A1 | * | 11/2012 | E04G 21/3261 |
| EP | 3020887 | A1 | * | 5/2016 | A62B 35/0068 |
| KR | 101322660 | B1 | * | 10/2013 | H02G 1/02 |
| KR | 102399789 | B1 | * | 5/2022 | A62B 35/0068 |
| KR | 20240104513 | A | * | 7/2024 | E04H 12/10 |
| KR | 20240150214 | A | * | 10/2024 | A62B 35/0068 |
| KR | 20240172516 | A | * | 12/2024 | E04H 12/10 |
| KR | 20250030337 | A | * | 3/2025 | A62B 35/0068 |
| NZ | 737736 | A | * | 7/2024 | |
| WO | WO-2004060492 | A1 | * | 7/2004 | E04G 5/041 |
| WO | WO-2006056793 | A1 | * | 6/2006 | E04G 21/3261 |
| WO | WO-2022208186 | A1 | * | 10/2022 | E06C 7/186 |

OTHER PUBLICATIONS

Grainger, "LAD-SAF Flexible Cable Safety System: Trailing, Steel, Auto, 40 ft Lifeline Lg, 620 lb Capacity," retrieved Jul. 2024 from the Internet: [URL: https://www.grainger.com/product/487R50?gucid=N:N:PS:Paid:GGL: CSM-2295:4P7A1P:20501231&gad_source=1&gclid=EAIaIQobChMIyrut9rrChwMVs0f_AR1rjwpmEAQYASABEgIQNPD_BwE&gclsrc=aw.ds], 2 pages.

Industrial Safety Products, "3M DBI SALA 6118050 Lad-Saf Cable Vertical Safety 2-User System Galvanized Steel 50Ft," retrieved Jul. 2024 from the Internet: [URL: 3M DBI SALA 6118050 Lad-Saf Cable Vertical Safety 2-User System Galvanized Steel 50Ft], 4 pages.

Northern Strands, "Bin Safe System," retrieved Jul. 2024 from the Internet: [URL: https://shop.northernstrands.com/fall-protection/bin-safe-system/], 6 pages.

Safewaze, "020-12101: EVO 3/8" Detachable Cable Sleeve," Product Manual, May 2024, available online: [URL: https://safewaze.com/wp-content/uploads/2024/06/220-00028-020-12101-V2.pdf], 2 pages.

Safewaze, "020-12101: EVO 3/8" Detachable Cable Sleeve," Technical Data Sheet, Mar. 2023, available online: [URL: https://safewaze.com/wp-content/uploads/2023/04/020-12101-TDS.pdf], 1 page.

Safewaze, "Take the Next Step in Ladder Safety: Safewaze Ladder Climb System," Product Brochure, Feb. 2021, available online: [URL: https://safewaze.com/wp-content/uploads/2022/01/SAFEWAZE-LADDER-CLIMB-SYSTEM-BROCHURE.pdf], 4 pages.

* cited by examiner

FALL ARREST SYSTEM

PRIORITY APPLICATION

This application claims the benefit of U.S. Provisional Patent Application Ser. No. 63/465,319, filed May 10, 2023, the disclosure of which is incorporated herein by reference in its entirety.

BACKGROUND

I. Field of the Disclosure

The technology of the disclosure relates generally to a safety mechanism such as a fall arrest system, which may be used to assist individuals operating at heights.

II. Background

There are many situations where an individual may need to be positioned on top of a tall structure. Such situations abound in the agricultural setting where silos, feed bins, hopper tanks, bulk feed tanks, rooftops, and the like are common. Responsive to the risk of bodily harm that may occur should a person fall from such heights, the Occupational Safety and Health Administration (OSHA) has promulgated several rules to promote safety.

In particular, there are several rules relating to safety associated with ladders on the sides of structures. In the past, a cage could be used with a ladder to prevent a fall. That is, a person climbing a ladder was also enclosed in a surrounding cage structure such that if the person slipped or released the ladder, downward motion was prevented by the confining nature of the cage. Such fall-prevention devices have been deemed inadequate by OSHA, and OSHA now mandates that there be a fall arrest system associated with such ladders and structures. In essence, a fall arrest system arrests or stops a fall after the fall has begun. Several commercial products have been sold to address the OSHA rule. However, there remains room for innovation associated with fall arrest systems.

SUMMARY

Aspects disclosed in the detailed description include a fall arrest system. In particular, a structure may include a collar on the roof portion of the structure. A U or V-shaped anchor point has leaves or legs of the U or V-shape attached to spaced-apart locations on the collar. A cable may be attached to the anchor point and extended off the roof and down a side of the structure proximate to a ladder. A distal end of the cable may be tensioned by a cable tensioner. A rope grab may be attached to the cable. A guide, pulley, or similar structure may be used at the edge of the roof and side to protect the cable from rubbing against the edge. In use, a person attaches to the rope grab and climbs the ladder to the top of the structure.

In this regard, in one aspect, a fall arrest system is disclosed. The fall arrest system includes a cable. The fall arrest system further includes an anchor point coupled to a first end of the cable, the anchor point comprising a first leaf and a second leaf configured to attach to a peak collar at spaced apart locations.

In another aspect, a cable guide is disclosed. The cable guide includes a back portion comprising a back cut-out configured to fit over a portion of a ladder rung and a front portion comprising a front cut-out configured to fit over a remaining portion of the ladder rung to secure the cable guide to the ladder rung, the front portion further comprising a U-shaped channel configured to allow a rope grab to transition past the cable guide without necessitating detaching the cable guide from a cable held in the U-shaped channel.

DETAILED DESCRIPTION

Figure 1:
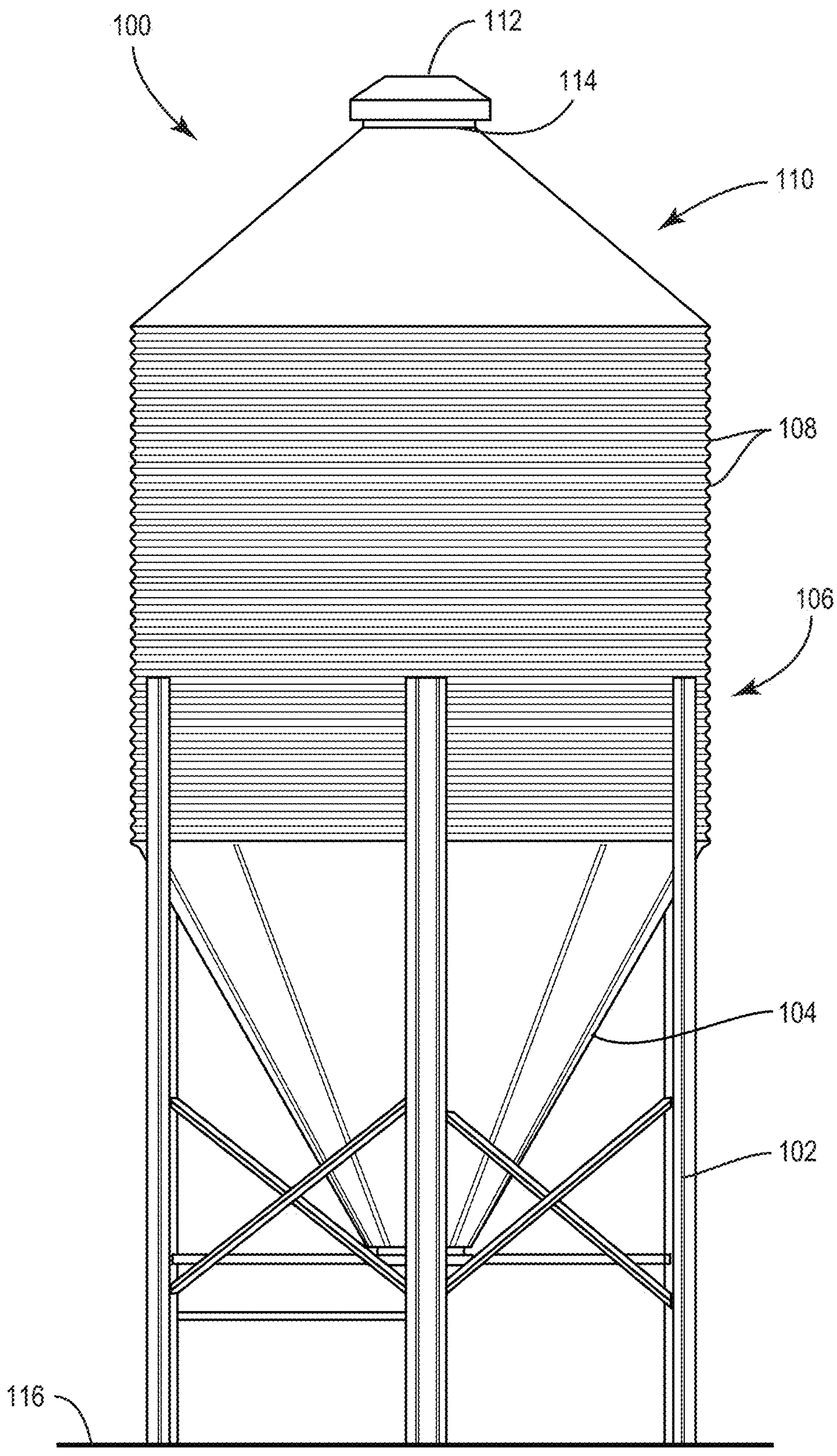
FIG. 1 is a structure that may be subject to a safety rule and benefit from aspects of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a fall arrest system. In particular, a structure may include a collar on the roof portion of the structure. A U or V-shaped anchor point has leaves or legs of the U or V-shape attached to spaced-apart locations on the collar. A cable may be attached to the anchor point and extended off the roof and down a side of the structure proximate to a ladder. A distal end of the cable may be tensioned by a cable tensioner. A rope grab may be attached to the cable. A guide, pulley, or similar structure may be used at the edge of the roof and side to protect the cable from rubbing against the edge. In use, a person attaches to the rope grab and climbs the ladder to the top of the structure.

In this regard, FIG. 1 is a side elevational view of a structure 100. Particularly contemplated structures include feed bins, hopper tanks, bulk feed tanks, and the like. The structure 100 may include posts 102, a tapered bottom 104, and generally vertical sidewalls 106, which may (or may not) include corrugations 108. Additionally, the structure 100 may include a roof portion 110. As illustrated, the roof portion 110 may be sloped. Additionally, the roof portion 110 may include a peak portion 112 coupled to the main body by a peak ring 114.

While not shown, historically, a ladder may be attached to the vertical sidewalls 106 and extend to a ground level 116. The ladder might also extend with side rails to the peak ring 114.

As discussed above, the Occupational Safety and Health Administration (OSHA) requires that such a structure 100 includes a fall arrest system if there is a ladder. Some entities have decided to forego such ladders and use an external lifting device, such as a cherry picker, to lift individuals to the roof. While an option, such solutions are not practical for some deployments. While a specific structure has been shown, it should be appreciated that other structures, such as barns, grain silos, or the like, may also have similar concerns.

Exemplary aspects of the present disclosure contemplate adding a fall arrest system to the structure 100. At its core, the fall arrest system is a cable having a rope grab on the cable. The cable extends up the side of the structure 100 adjacent to the ladder to the peak ring. An individual attaches themselves to the rope grab using a belt, shock-absorbing lanyard, or other mechanism and climbs up the ladder. The rope grab has an internal pivot such that once the center of gravity moves beyond the rope grab (such as occurs when a person is falling), a clamp activates and prevents the cable from passing through the rope grab. The belt then stops the individual from further movement, hopefully preventing injury to the individual during a fall.

Figure 2D:
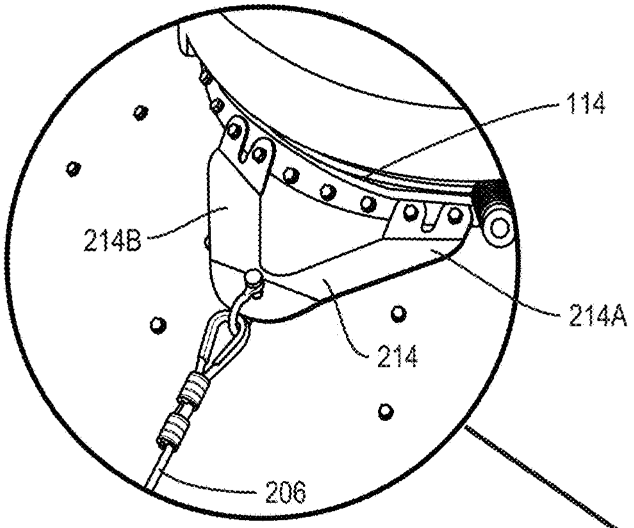
FIG. 2 is a side elevational view of the structure of FIG. 1 with a fall arrest system of the present disclosure attached thereto, including exploded portions 2A-2D.
Figure 2C:
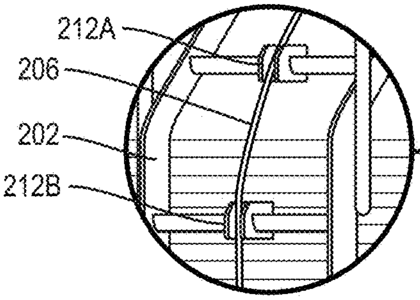
Figure 2B:
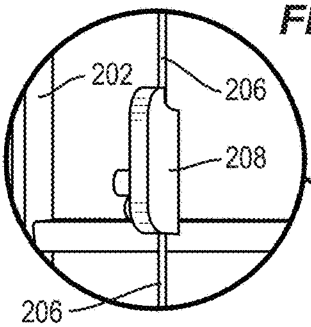
Figure 2A:
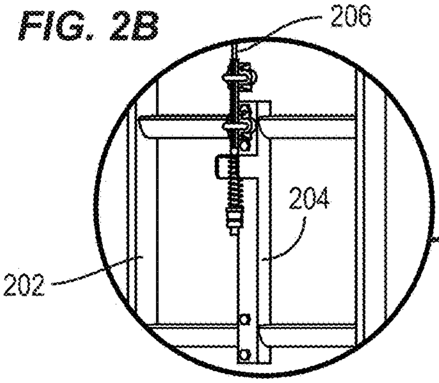
Figure 2:
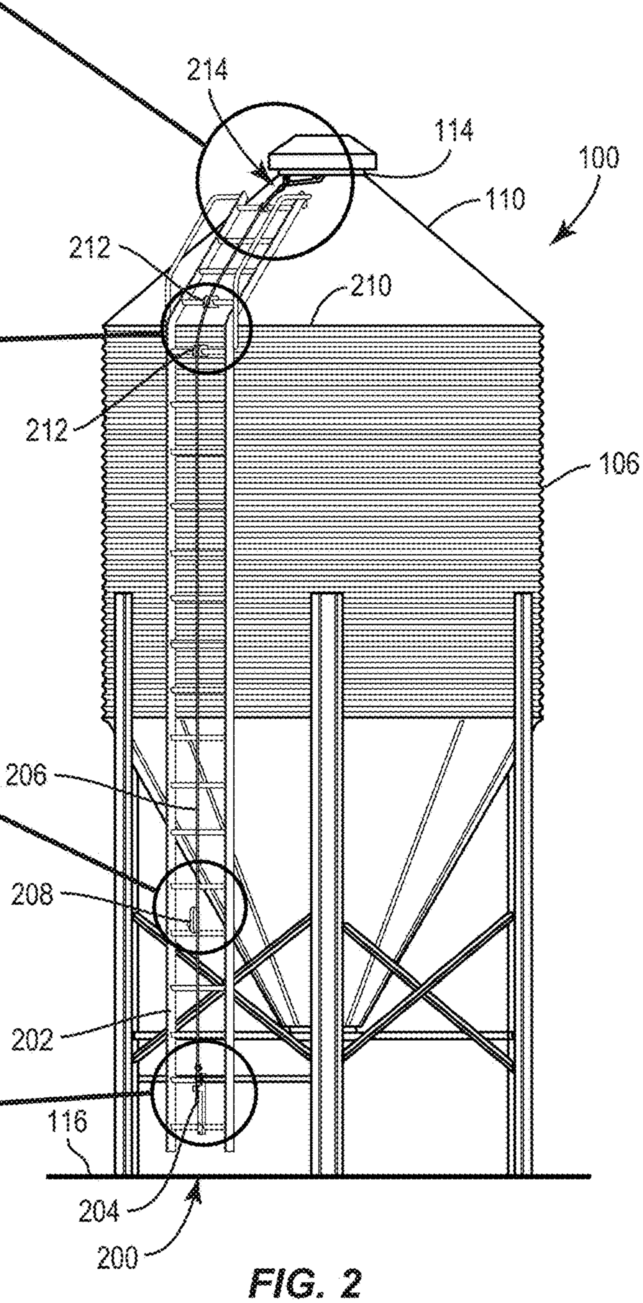

In this regard, FIG. 2 illustrates a fall arrest system 200 that works in conjunction with a ladder 202 attached to the structure 100. Proximate to the ground level 116, a cable tensioner 204 may be bolted or otherwise secured to a lower end of the ladder 202 (see also FIG. 2A). By means of the cable tensioner 204, a cable 206 is firmly secured to the ladder. The cable 206 may, for example, be a ⅜" diameter stainless steel cable. When not in use, a rope grab 208 will rest at the bottom of the cable 206 (see also FIG. 2B). In an exemplary aspect, the rope grab 208 may be the EVO ⅜" DETACHABLE CABLE SLEEVE made by SAFEWAZE of 225 Wilshire Avenue, Concord, NC 28025, although other rope grabs are commercially available and may be used. At an edge 210 between the vertical sidewalls 106 and the roof portion 110, the ladder 202 may bend to follow the roof portion 110 up the sloped portion. Cable guides or pulleys 212A, 212B (see also the discussion for FIGS. 4 and 5 below), or other device may be used to prevent the cable 206 from rubbing on the edge 210 (see also FIG. 2C) while also allowing the rope grab 208 to continue movement along the cable 206. A top portion of the cable 206 is attached to the peak ring 114 by a U or V-shaped anchor point 214. Specifically, a first leaf or leg 214A is attached at a first point on the peak ring 114, and a second leaf or leg 214B is attached at a second point spaced from the first point (see also FIG. 2D). By spreading the points of attachment, stress on the peak ring 114 is spread out so that such stress does not deform the peak ring 114 during a fall condition.

Figure 3:
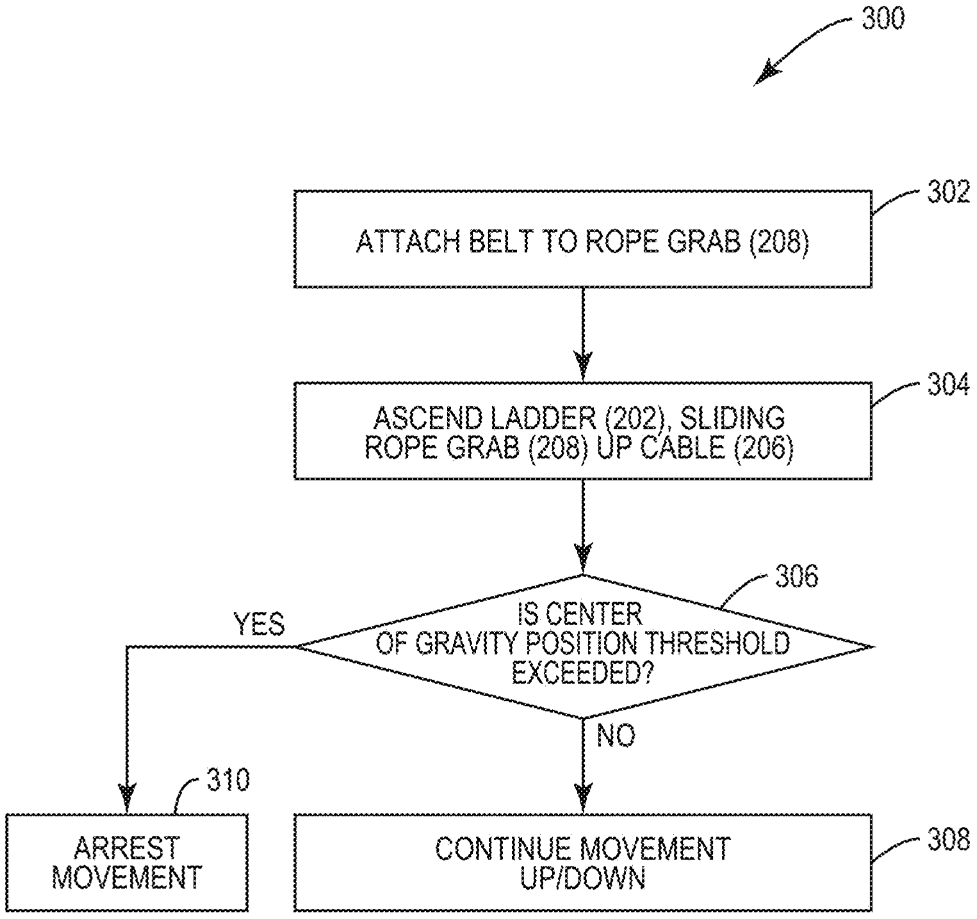
FIG. 3 is a flowchart illustrating an exemplary process for using the fall arrest system of FIG. 2.

FIG. 3 is a flowchart describing a process 300 for using the fall arrest system 200. In particular, the process 300 begins by approaching the structure 100 and attaching a belt to the rope grab 208 (block 302). The individual attached to the belt begins to ascend the ladder 202, lifting or sliding the rope grab 208 up the cable 206 (block 304). The rope grab 208 detects if a center of gravity position is exceeded (block 306). If the threshold is not exceeded, the individual may continue movement up or down (block 308), presumably to the top, to perform service on the roof and then descend. If, at any point, the center of gravity threshold is exceeded at block 306, then the rope grab arrests movement (block 310).

The EVO Cable Sleeve has a general size and shape that does not fit through conventional cable guides. In such circumstances, the climber may have to stop climbing, disengage the rope grab or cable sleeve from the cable just below the cable guide, and then reattach the rope guide above the cable guide. Setting aside the inconvenience of the climbing pause while this evolution is performed, there is also a window of increased risk where the rope grab is not attached to the cable, raising the possibility of fall.

Figure 4:
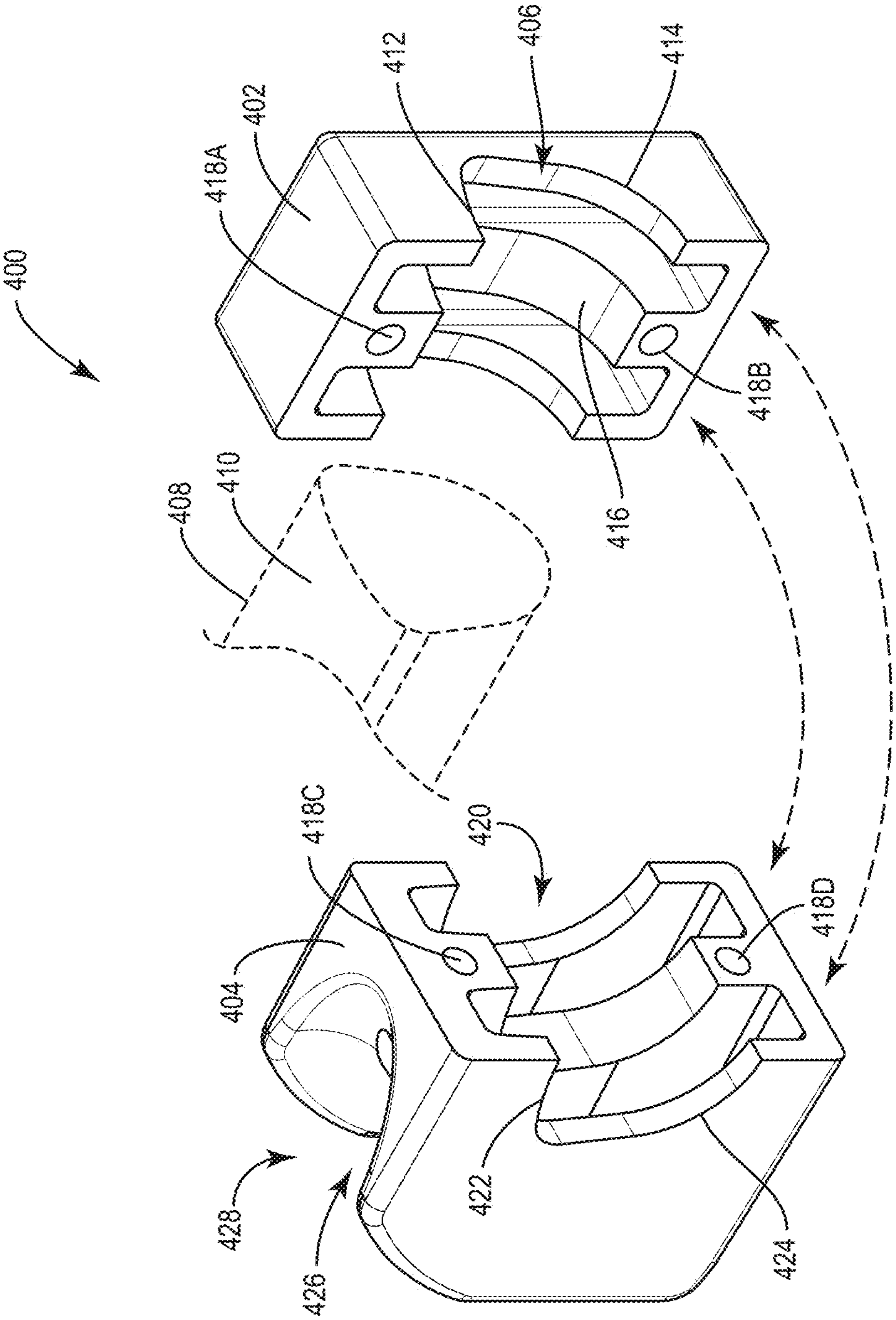
FIG. 4 illustrates an exploded isometric view of one cable guide adapted for use with an HSI-brand style ladder rung.
Figure 5:
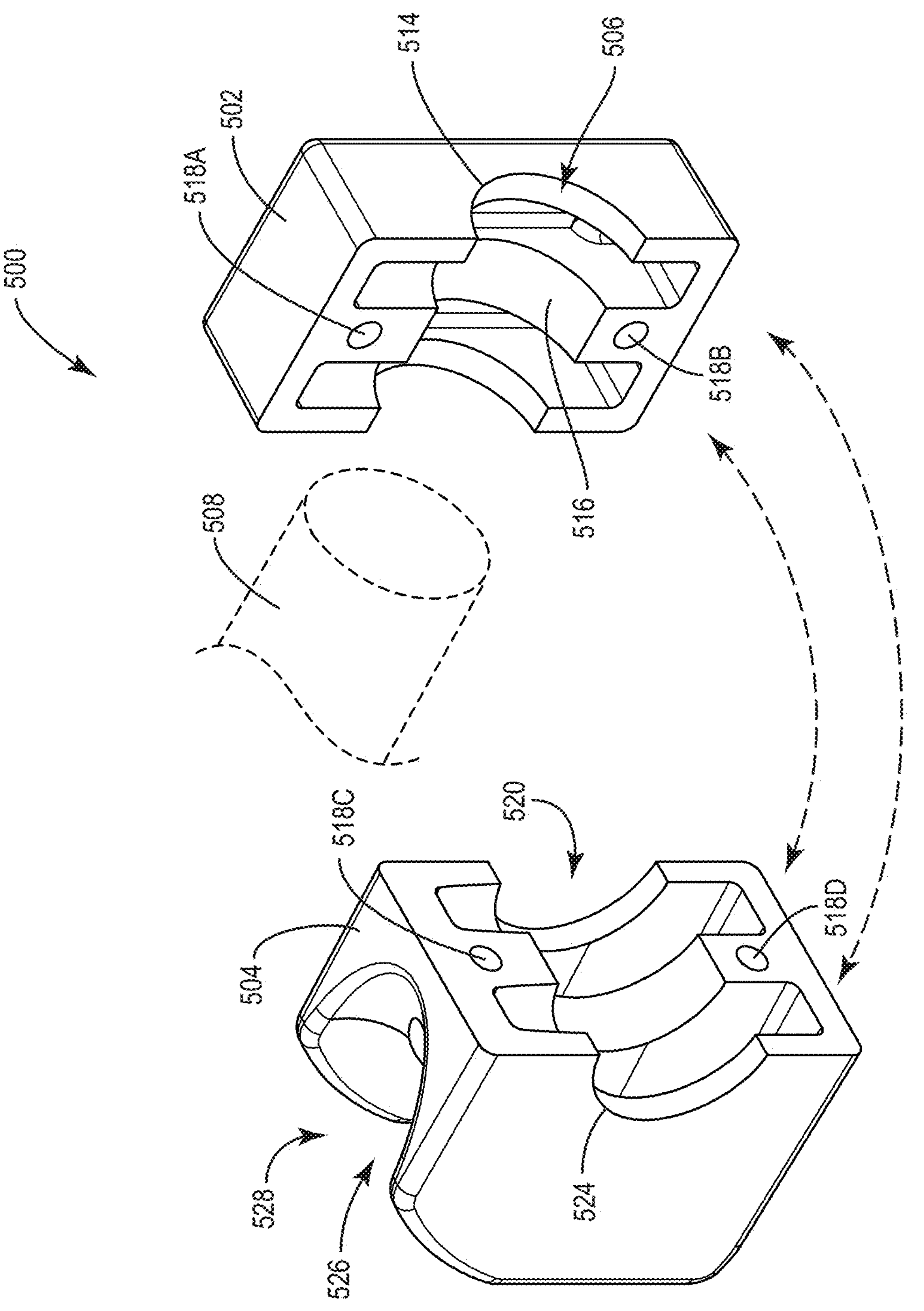
FIG. 5 illustrates an exploded isometric view of another cable guide adapted for use with a round ladder rung.

Aspects of the present disclosure contemplate a cable guide that includes a cable-facing side that is shaped to complement the shape of the EVO Cable Sleeve, allowing the rope grab to slide over the cable guide without having to be disengaged. FIGS. 4 and 5 illustrate two possible cable guides (for use as cable guides 212A, 212B discussed above).

In this regard, FIG. 4 illustrates a cable guide 400 having a back portion 402 and a front portion 404. The back portion 402 has a cut-out 406 that is shaped to fit around/over an HSI-brand ladder rung 408 (which is not round but includes a generally flat upper surface 410). Thus, the cut-out 406 has a generally flat portion 412 and an arc 414. There may be an internal ridge 416 to provide additional structural integrity.

Apertures 418A, 418B may be provided and have internal threads to accommodate a screw or bolt to attach the back portion 402 to the front portion 404.

The front portion 404 also includes a cut-out 420 that is configured to fit around/over the rung 408 and, as such, has a generally flat portion 422 and an arc 424. There may be apertures 418C, 418D that align with the apertures 418A, 418B and are threaded to assist in fastening the front portion 404 to the back portion 402. An operative face 426 of the front portion 404 includes a U-shaped channel 428 that is shaped to complement a shape of the rope grab and allow the rope grab to side within the channel 428.

Similarly, FIG. 5 illustrates a cable guide 500 having a back portion 502 and a front portion 504. The back portion 502 has a cut-out 506 that is shaped to fit around/over a round ladder rung 508, thus the cut-out 506 has an arc 514. There may be an internal ridge 516 to provide additional structural integrity. Apertures 518A, 518B may be provided and have internal threads to accommodate a screw or bolt to attach the back portion 502 to the front portion 504.

The front portion 504 also includes a cut-out 520 that is configured to fit around/over the rung 508 and, as such, has an arc 524. There may be apertures 518C, 518D that align with the apertures 518A, 518B and are threaded to assist in fastening the front portion 504 to the back portion 502. An operative face 526 of the front portion 504 includes a U-shaped channel 528 that is shaped to complement a shape of the rope grab and allow the rope grab to side within the channel 528.

It should further be appreciated that the cable may rest in the U-shaped channel 428, 528 when the rope grab is not passing over the cable guide. Likewise, while the U-shaped channel works well with the EVO CABLE SLEEVE, other shapes may be used to work with other rope grabs and/or the cut-outs may be reshaped to interoperate with differently shaped rungs.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A fall arrest system comprising:

a cable; and an anchor point coupled to a first end of the cable, the anchor point comprising:

a first portion delimiting a cable aperture configured to allow attachment to the cable;

a first leg and a second leg, both legs extending from the first portion such that a U or V shape is formed, each leg configured to attach to a continuous circular peak ring at spaced apart locations on the ring, such that stress on the peak ring is spread out so that such stress does not deform the peak ring, wherein the first leg comprises;

a first generally planar leg portion, the first generally planar leg portion extending from the first portion in a first plane; and a second leg portion spaced from the first portion and extending in a second plane angled relative to the first plane, the second leg portion delimiting at least one aperture configured to receive a fastener to attach the anchor point to the peak ring; and the second leg is substantially a mirror image of the first leg to form the U or V shape.

2. The fall arrest system of claim 1, wherein the cable comprises a stainless-steel cable.

3. The fall arrest system of claim 1, further comprising a rope grab on the cable and capable of moving up and down the cable.

4. The fall arrest system of claim 3, wherein the rope grab is configured to allow movement based on a center of gravity position relative to the rope grab.

5. The fall arrest system of claim 1, further comprising a cable tensioner coupled to the cable at a second end of the cable.

6. The fall arrest system of claim 5, wherein the cable tensioner is configured to attach to a ladder.

7. The fall arrest system of claim 1, further comprising a cable guide having a u-shaped channel configured to allow the cable to rest therein.

8. The fall arrest system of claim 7, further comprising a rope grab on the cable and capable of moving up and down the cable and capable of passing through the cable guide without having to be disengaged from the cable.

9. The fall arrest system of claim 7, wherein the cable guide comprises a back portion defining a back cut-out and a front portion comprising a front cut-out, wherein the front and back cut-outs are shaped to fit around a ladder rung.

10. The fall arrest system of claim 9, wherein the front and back cut-outs both include a generally flat portion and an arcuate portion.

11. The fall arrest system of claim 9, wherein the front and back cut-outs are configured to fit around a round rung.

* * * * *